April 27, 1954
F. L. MALTBY
2,677,093
DETECTOR FOR DIRECT-CURRENT POTENTIALS
Filed Oct. 6, 1948
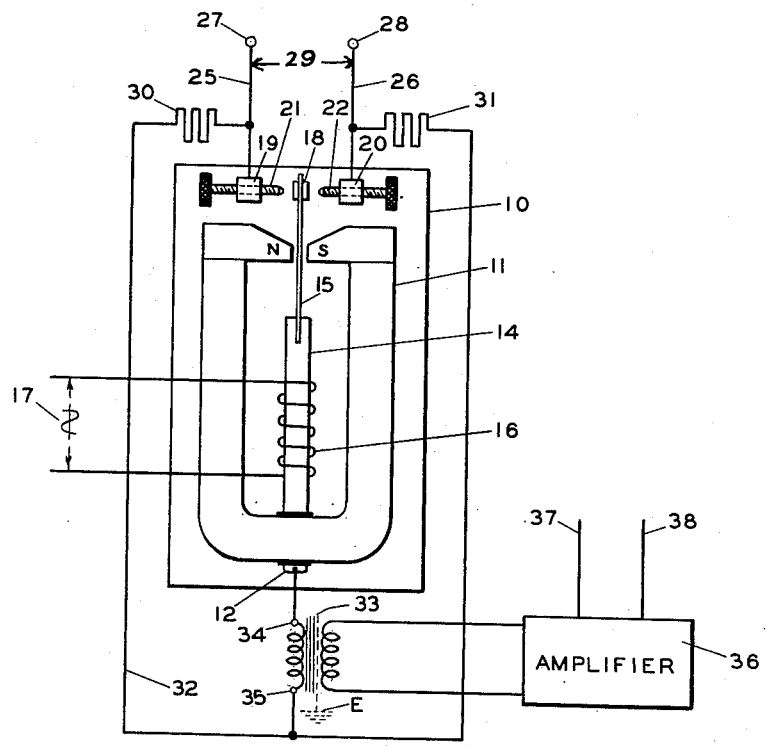
INVENTOR.
Frederick L. Maltby
BY
E. C. Sanborn
Attorney Patented Apr. 27, 1954

2,677,093

UNITED STATES PATENT OFFICE 2,677,093

DETECTOR FOR DIRECT-CURRENT POTENTIALS

Frederick L. Maltby, Naugatuck, Conn., assignor to The Bristol Company, Waterbury, Conn., a corporation of Connecticut Application October 6, 1948, Serial No. 53,077

2 Claims. (Cl. 321—49)

This invention relates to means for detecting small unidirectional potentials and producing therefrom alternating potentials of proportional magnitude and of phase position dependent upon the polarity of said unidirectional potentials. In direct-current measuring networks such as potentiometers and bridges it is sometimes customary to determine unbalanced conditions by the expedient of interrupting, commutating or "chopping" the potential to be detected, and thereby rendering it suitable to amplification by means of an electronic network, usually including one or more transformers. The output of such a transformer-amplifier combination may then be utilized in a suitable alternating-current motor for rebalancing the network, or otherwise reducing to zero the potential applied to the detector.

Conventional forms of detector systems applicable to this purpose are subject to two objectionable features, either of which may tend to produce a false balance and thereby introduce errors in the measurement. The effects responsible for these objectionable features are that of thermoelectric potentials at the points of circuit interruption and that of asymmetrical action in the inverter system.

Experience has demonstrated the impracticability of completely eliminating contact potentials in circuit-controlling systems of the nature essential to the utilization of interrupters and the like in detector systems; and, while by careful selection of coacting contact materials, these effects may be minimized, there is no assurance that under continued operation such effects may not reappear. With the conventional methods of connection heretofore used in such systems, the potentials developed in mating paired contacts tend to act continuously in the same sense as the potential under measurement, either additively or subtractively, thus appearing as a definite error in the inverted and amplified electromotive force.

In the conventional form of inverter of the class under consideration it has heretofore been customary to employ a transformer having a double primary winding, in which it is necessary that the two sections of the winding be identical in all their characteristics. Under such a condition, the unidirectional potential in the detector circuit will be inverted into a symmetrical alternating potential, which, when suitably filtered, will have a wave-form sufficiently good for the operation of a small motor or other controlling device. If the detector circuit should be subject to "pick-up," with resultant alternating potentials induced therein, a truly symmetrical commutating device will eliminate the fundamental frequency, and, if operated synchronously with the frequency of the "pick-up," will produce, at worst, a double frequency component in the output. If, however, the detector circuit associated with a commutator or interrupter which is not symmetrical in its performance should be subject to pick-up of the same frequency as that of interruption, a component having this frequency will appear in the output circuit of the detector, and may produce the above-mentioned misleading conditions, resulting in false balance and a corresponding error of measurement.

It is an object of the present invention to provide a synchronous contactor for performing the function of inversion which shall be characterized by the inherent symmetry whereby to minimize the undesirable effects of alternating electromotive force existing in the direct-current portion of the circuit.

It is a further object to provide a synchronous contactor of the above nature in which the effects of thermoelectric or other potentials between different metals shall be inherently neutralized to produce a negligible effect in the output potential.

In carrying out the purposes of the invention it is proposed to provide a synchronous vibrating contactor having two stationary contacts connected to the two sides of the source of unidirectional electromotive force to be inverted and a cooperating movable contact adapted to engage said stationary contacts alternately, whereby to provide a circuit first from one, and then from the other, of the two sides of said unidirectional source through the single primary winding of a transformer. The return circuit from said winding is provided through one or the other of two branches having equal resistance values, whereby may be assured greater precision in construction and adjustment than is possible in a transformer having a primary comprised of two supposedly identical sections. As will be made clear from a study of the specification and of the operation of the device as hereinafter presented, the proposed construction renders such parasitic electromotive forces as may be set up in the system subject to inherent neutralization, with a minimum possibility of effects due to such potentials being recovered at the output terminals.

The single figure of the drawings is a representation of a synchronous vibrating contactor with associated circuits whereby a unidirectional potential may be detected and caused to produce an alternating potential representative of the unidirectional potential.

The numeral 10 designates a base plate having mounted theeron a permanent magnet member 11 fitted with mutually opposed pole pieces N and S, providing therebetween an air-gap to be traversed by the flux of said magnet. Insulatedly supported upon the yoke portion of the magnet 11 and secured thereto, as by a screw 12, is a ferromagnetic core 14 having fixed to its free extremity a resilient spring or reed 15 of steel or other magnetic material, free to oscillate in the air gap of the magnet 11. Surrounding the core 14 is a winding 16 adapted to be energized from a suitable alternating current source 17, whereby said core 14 and the reed 15 will be subjected to alternating magnetic excitation.

Carried by an extended portion of the reed 15 is a double sided contact 18 adapted to be moved through a limited distance by vibration of said reed. Adjustably secured in posts 19 and 20 insulatedly mounted upon the base plate 10 are stationary contacts 21 and 22 juxtaposed to the respective faces of the contact 18 and so positioned as to be alternately engaged by said contact 18 as it moves with vibration of the reed 15. It is a well known fact that co-acting contacts carrying small currents and operating at relatively low potential differences should be formed of different materials; and, while contact materials form no part of the present invention they must be taken into consideration in the design of any apparatus embodying its principles. It is further known that where differing materials are used in mating contacts it is virtually impossible to eliminate contact potentials from the controlled circuits. With a view to minimizing such effects, and with the object of neutralizing the residual effects inseparable from such combinations, the movable contact 18 may be formed of one material, such as platinum, and the two stationary contacts 21 and 22 of another material, such as a platinum-iridium alloy.

Two conductors 25 and 26 are connected to terminals 27 and 28 respectively between which may be impressed from a source 29 a unidirectional potential to be converted into its alternating equivalent. The conductors 25 and 26 are connected to the posts 19 and 20, and thereby to the adjustable stationary contacts 21 and 22 respectively. The conductors 25 and 26 are connected in series with equal resistors 30 and 31 respectively to a common conductor 32. A transformer 33, provided with primary terminals 34 and 35, has the former of said terminals connected to the core 14, and thence through the reed 15 to the movable contact 18, and the latter terminal to the common conductor 32, which thus provides a path having two branches of equal resistance between the terminal 35 and the contacts 21 and 22, respectively. The transformer 33 may, if desired, be provided a grounded electrostatic shield, as indicated at E.

Thus, as will be more fully pointed out, the primary terminals of the transformer 33 become the output terminals of the detector system. The secondary winding of the transformer 33 may be connected to the input terminals of a suitable alternating-current amplifier 36, having output terminals 37 and 38 which, in turn, may be connected to any suitable measuring or controlling circuit.

In operation, with the winding 16 energized from the alternating current source 17, the reed 15, according to well-known principles, oscillates synchronously with the cyclic variation of applied potential. Thus, the contact 18 will engage alternately the contacts 21 and 22, thereby completing a path between terminal 34 of the primary of the transformer 33 and the conductor 25 or 26, as the case may be. When the contact 18 is in its mid-position, engaging neither the contact 19 nor the contact 20, the only circuit between conductors 25 and 26 will be through the resistors 30 and 31 and the conductor 32 in series, the primary of the transformer 33 remaining open-circuited. Upon engagement of the contact 18 with either of the contacts 21 and 22, a circuit is completed through the transformer primary 33, the conductor 32, and one or other of the resistors 30—31. Thus, with oscillation of the contact 18 between the contacts 21 and 22, the primary of the transformer 33 receives pulses of alternate polarity from any direct-current potential which may be applied between the terminals 27 and 28. There will thus be developed in the secondary of the transformer 33 an alternating potential having the frequency of the source 17, and varying in magnitude with the potential applied between terminals 27 and 28. Furthermore, it will be apparent should the polarity of said unidirectional potential be reversed, the output of the transformer 33 will likewise be reversed in its phase position with respect to the potential of the source 17. The output of the transformer 33, being applied to the amplifier 36 will produce at the output terminals 37 and 38 of said amplifier an alternating potential which may be utilized according to methods well known in the art, for the operation of a balance motor or other control device.

Since inequality in the amplitudes of the alternate pulses applied to the primary of the transformer 33 will result in undesirable performance characteristics, and, in the event of an alternating component of synchronous frequency existing in the potential applied between the terminals 27 and 28, will be responsible for an undesirable alternating component of the same frequency in the output of the transformer 33, it becomes essential that the two branches of the circuit, as represented principally by the resistors 30 and 31, be adjusted to equal impedance values. A similar requirement applied to those examples of the prior art in which the two branches of the circuit are represented by two windings or portions of a winding in a transformer; and one of the principal advantages of the present invention lies in the fact that, whereas the adjustment of transformer winding or sections of windings to have the required degree of identity is a difficult and expensive production problem, there may be commercially obtained without difficulty resistance units having the required degree of identity; and, in any event, adjustment to bring the resistors 30 and 31 to equal value may readily be performed at any time and at relatively low expense.

A further advantage characterizing the present invention lies in the fact that electromotive forces developing between the contact 18 and either of the contacts 21 and 22 do not tend to introduce false characteristics in the alternating potentials developed. Because the contacts 21 and 22 would presumably be made of identical material, the electromotive force of either of these to the contact 18 would tend to produce in the primary winding of the transformer 33 a current having the same direction without respect to which of the two stationary contacts might be engaged by the contact 18. Thus, any pulses impressed upon said winding due to contact potentials would have a frequency double that of the fundamental frequency of the system, and therefore, even if not eliminated by the transformer and amplifier system, would be of such a nature as to produce no objectionable results.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. An electrical circuit arrangement for converting a relatively small direct current potential into a larger alternating current potential having a predetermined frequency and having magnitude and phase proportional to the magnitude and polarity, respectively, of the direct current potential, comprising a source of said direct current potential having a first pair of terminals, a source of alternating current potential having said predetermined frequency, a pair of stationary contacts each connected to a respective one of said first pair of terminals, two equal resistors having one end of each connected to a respective one of said first pair of terminals, a transformer having a primary winding provided with two terminals, a common conductor interconnecting one terminal of said primary winding and the other ends of said equal resistors, a movable contact adapted for alternate engagement with said stationary contacts and connected to the other terminal of said primary winding, and polarized means connected to and responsive to the frequency of said source of alternating current potential for shifting said movable contact alternately into engagement with said stationary contacts thereby to apply an alternating potential from said contacts to said primary winding, said latter potential having a magnitude and phase proportional, respectively, to the magnitude and phase of said direct current potential.

2. An electrical circuit arrangement for converting a relatively small direct current potential into a larger alternating current potential having a predetermined frequency and having magnitude and phase proportional to the magnitude and polarity, respectively, of the direct current potential, comprising a source of said direct current potential having a first pair of terminals, a source of alternating current potential having said predetermined frequency, a pair of stationary contacts each connected to a respective one of said first pair of terminals, two equal resistors having one end of each connected to a respective one of said first pair of terminals, a transformer having a primary winding provided with two terminals, a common conductor interconnecting one terminal of said primary winding and the other ends of said equal resistors, a movable contact adapted for alternate engagement with said stationary contacts and connected to the other terminal of said primary winding, and polarized means responsive to the frequency of said source of alternating current potential for shifting said movable contact alternately into engagement with said stationary contacts thereby to apply an alternating potential from said contacts to said primary winding, said latter potential having a magnitude and phase proportional, respectively, to the magnitude and phase of said direct current potential, said polarized means comprising a supporting member arranged to carry said movable contact and a winding connected to said source of alternating current potential and arranged to produce vibrations of said support at said predetermined frequency.

References Cited in the file of this patent

UNITED STATES PATENTS

| Number | Name | Date |
| --- | --- | --- |
| 711,276 | Batten | Oct. 14, 1902 |
| 928,583 | Burlingame | July 20, 1909 |
| 1,691,986 | Nyquist | Nov. 20, 1928 |
| 2,133,670 | Schuchmann | Oct. 18, 1938 |
| 2,180,487 | Triplett | Nov. 21, 1939 |
| 2,298,003 | Feingold | Oct. 6, 1942 |
| 2,300,742 | Harrison | Nov. 3, 1942 |
| 2,313,527 | Edwards | Mar. 9, 1943 |
| 2,352,299 | Walker | June 27, 1944 |
| 2,385,481 | Wills | Sept. 25, 1945 |
| 2,456,420 | Jackson | Dec. 14, 1948 |